United States Patent [19]
Doerge

[11] Patent Number: 5,426,127
[45] Date of Patent: Jun. 20, 1995

US005426127A

[54] RIGID FOAMS WITH IMPROVED INSULATION AND PHYSICAL PROPERTIES

[75] Inventor: Herman P. Doerge, Pittsburgh, Pa.

[73] Assignee: Miles Inc., Pittsburgh, Pa.

[21] Appl. No.: 312,346

[22] Filed: Sep. 26, 1994

[51] Int. Cl.[6] .................................................. C08J 9/00
[52] U.S. Cl. ...................................... 521/131; 521/164
[58] Field of Search ................................. 521/131, 164

[56] References Cited

U.S. PATENT DOCUMENTS

| | | | |
|---|---|---|---|
| 2,697,113 | 12/1954 | Lundsted et al. | 260/584 |
| 3,085,085 | 4/1954 | Wismer et al. | 260/209 |
| 3,153,002 | 10/1964 | Wismer et al. | 260/2.5 |
| 3,222,357 | 12/1965 | Wismer et al. | 260/209 |
| 4,430,490 | 2/1984 | Doerge | 528/77 |
| 4,900,365 | 2/1990 | Lund et al. | 134/12 |
| 4,931,482 | 6/1990 | Lamberts et al. | 521/131 |
| 4,972,002 | 11/1990 | Volkert | 521/120 |
| 5,164,418 | 11/1992 | Behme et al. | 521/131 |
| 5,164,419 | 11/1992 | Bartlett et al. | 521/131 |
| 5,169,873 | 12/1992 | Behme et al. | 521/114 |

OTHER PUBLICATIONS

Dishart et al., "The Dupont Program on Fluorocarbon Alternative Blowing Agents for Polyurethane Foams" Polyurethane World Congress 1987, Sep. 29–Oct. 2, 1987, pp. 59–66.

*Primary Examiner*—Morton Foelak
*Attorney, Agent, or Firm*—Joseph C. Gil; Lyndanne M. Whalen

[57] ABSTRACT

Rigid polyurethane foams are produced by reacting an organic polyisocyanate with an amine-based polyether polyol in the presence of a catalyst, a hydrogen-containing fluorocarbon and a minor amount of water. These foams are characterized by K-factors which are about 0.135 BTU-in./hr.ft.$^2$ °F. or less.

9 Claims, No Drawings

RIGID FOAMS WITH IMPROVED INSULATION AND PHYSICAL PROPERTIES

BACKGROUND OF THE INVENTION

The present invention relates to a process for the production of rigid polyurethane foams having a K-factor of about 0.135 BTU-in.hr.ft.$^2$°F. or less in which an HFC (hydrogen-containing fluorocarbon) in combination with a minor amount of water is used as the blowing agent.

Processes for the production of rigid polyurethane foams are known. See, for example, U.S. Pat. Nos. 3,085,085; 3,153,002; 3,222,357; and 4,430,490.

At the present time, a major concern of foam producers, particularly rigid foam producers, is the development of rigid foam systems in which the chlorofluorocarbon blowing agent is replaced with a more environmentally acceptable blowing agent. HCFCs (i.e., hydrogen containing chlorofluorocarbons), HFCs (hydrogen containing fluorocarbons), and hydrocarbons such as n-pentane cyclopentane, isopentane and blends of these blowing agents are presently considered to be possible alternatives.

U.S. Pat. No. 4,900,365, for example, teaches that a mixture of trichlorofluoromethane, a dichlorofluoroethane selected from a specified group and isopentane is useful as a blowing agent for the preparation of polyurethane foams. Dishart et al's paper entitled "The DuPont Program on Fluorocarbon Alternative Blowing Agents for Polyurethane Foams", *Polyurethanes World Congress 1987*, pages 59–66 discusses the investigation of various HCFCs as possible blowing agents for rigid polyurethane foams. Neither of these disclosures, however, teaches a process for the production of rigid polyurethane foams having good physical properties from polyols with an HFG blowing agent.

U.S. Pat. No. 4,972,002 discloses a process for the production of cellular plastics in which an emulsion is used as the blowing agent. A low boiling fluorinated or perfluorinated hydrocarbon or sulfur hexafluoride is emulsified in one of the starting materials from which the foam is to be produced (i.e., the isocyanate, polyol, etc.)

U.S. Pat. No. 5,169,873 discloses a process for the production of foams in which the blowing agent is a mixture of at least one fluoroalkane corresponding to a specified formula and at least one fluorinated ether corresponding to a specified formula.

U.S. Pat. No. 5,164,419 discloses a process for the production of polyurethane foams in which 1,1-difluoroethane in combination with a minimum amount of water is used as the blowing agent. However, the only foam described in this disclosure had a K-factor of 0.18 BTU-in/hr-ft$^2$-°F.

U.S. Pat. No. 5,164,418 discloses a process for producing isocyanate-based foams in which the blowing agent is at least 10 mol % of a fluoroalkane. Mixtures of a fluoroalkane and significant amounts of water (i.e., greater than 20%) are exemplified.

U.S. Pat. No. 4,931,482 discloses the use of 1,1,1,4,4,4-hexafluorobutane as a blowing agent to produce isocyanate-based foams such as polyurethane and polyisocyanurate foams. The disclosed foams are made by reacting an isocyanate with any of the known isocyanate-reactive compounds. Water and other known blowing agents may optionally be used in combination with the required 1,1,1,4,4,4-hexafluorobutane blowing agent. The K-factors for foams produced using the hexafluorobutane blowing agent are not, however, reported.

Foams having initial K-factors below 0.135 BTU-in./hr.ft.$^2$ °F. which are blown with HCFC-141b or CFC-11 are used commercially in appliance and construction applications. A process in which a polyol could be used in combination with the more environmentally acceptable HFC blowing agents to produce a rigid polyurethane foam having good physical properties, particularly a K-factor which is about 0.135 or less would, therefore, be advantageous.

SUMMARY OF THE INVENTION

It is an object of the present invention to provide a process for the production of rigid polyurethane foams having K-factors of about 0.135 BTU-in./hr.ft$^2$°F. or less in which an HFC in combination with a minor amount of water is used as the blowing agent.

It is a further object of the present invention to provide a process for the production of rigid polyurethane foams which are useful in the production of refrigeration units.

It is another object of the present invention to provide rigid polyurethane foams characterized by K-factors of about 0.135 BTU-in./hr.ft$^2$°F. or less.

These and other objects which will be apparent to those skilled in the art are accomplished by reacting an organic polyisocyanate with an amine-initiated polyether polyol having an average molecular weight of at least about 149, preferably from about 149 to about 1500, in the presence of a hydrogen-containing fluorocarbon, a minor amount of water and a catalyst. Isocyanate-reactive compounds which are not amine-initiated may optionally be included in the reaction mixture in an amount of up to 50%, based on the total amount of isocyanate-reactive materials.

DETAILED DESCRIPTION OF THE PREFERRED EMBODIMENTS OF THE PRESENT INVENTION

The present invention is directed to a process for the production of rigid polyurethane foams having a K-factor which is about 0.135 BTU-in./hr.ft.$^2$ °F. or less and to the foams produced by this process. In the process of the present invention, (a) an organic isocyanate is reacted with (b) an amine-based polyether polyol having an average molecular weight of at least about 149, preferably from about 149 to about 1500, and a propylene oxide content of from about 65 to about 98% by weight, preferably from about 75 to about 98% by weight based on the total weight of the amine initiator plus the propylene oxide, in the presence of (c) a blowing agent made up of (1) at least one hydrogen-containing fluorocarbon and (2) a minor amount of water and (d) a catalyst, at an isocyanate index of from about 0.9 to about 3.1, preferably from about 1.05 to about 1.55. The product foams generally have K-factors of about 0.135 BTU-in./hr.ft$^2$°F. or less.

Any of the known organic isocyanates, modified isocyanates or isocyanate-terminated prepolymers made from any of the known organic isocyanates may be used in the practice of the present invention. Suitable isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexylmethane diisocyanates, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyldiphenylmethane-2,2',5,5'-tetraisocyanate and the polymethylene polyphenyl-polyisocyanates.

Undistilled or a crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanate include prepolymers containing NCO groups and having an NCO content of from about 25 to about 35 wt %, preferably from about 28 to about 32 wt %, particularly those based on polyether polyols or polyester polyols and diphenylmethane diisocyanate. Processes for the production of these prepolymers are known in the art.

The most preferred polyisocyanates for the production of rigid polyurethanes in accordance with the present invention are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 0.9 to about 3.0, preferably from about 1.0 to about 1.5.

The polyols employed in the process of the present invention are amine-initiated polyether polyols having functionalities of from about 3 to about 4 and molecular weights of at least about 149, preferably from about 149 to about 1500, most preferably from about 300 to about 800. These amine-based polyols are prepared by reacting an amine, polyamine or aminoalcohol and optionally other initiators (with or without water) with propylene oxide and optionally, ethylene oxide, in the presence of an alkaline catalyst. The product is then treated with an acid, preferably a hydroxy-carboxylic acid so as to neutralize the alkaline catalyst. U.S. Pat. No. 2,697,118 discloses a suitable process for the production of such amine-initiated polyols.

Examples of suitable amine initiators include: ammonia, ethylene diamine, diethylene triamine, hexamethylene diamine and aromatic amines such as toluene diamine, and aminoalcohols. Aminoalcohols, particularly, monoethanolamine, diethanolamine, and triethanolamine are preferred initiators.

It is preferred that the amine initiator be reacted with propylene oxide, although it may also be reacted with ethylene oxide. If used, the ethylene oxide may be used in an amount up to 100% by weight of the total alkylene oxide used. The propylene oxide is generally used in an amount of from about 40 to about 100% by weight of the total alkylene oxide employed, preferably from about 60 to about 100% by weight. The total amount of alkylene oxide used is selected so that the product polyol will have an average molecular weight of at least about 149, preferably from about 149 to about 1500.

The amine-based polyether polyol is included in the foam-forming mixture in an amount of from about 20 to about 70% by weight, based on the total foam-forming mixture, preferably from about 40 to about 50% by weight.

Other polyether polyols (i.e., polyether polyols which are not based on an amine) known to be useful in the production of rigid polyurethane foams as well as polyester polyols may optionally be used in combination with the required amine-based polyether polyol. When used, these optional polyols are present in an amount which is no greater than 80%, preferably from about 20 to about 50% of the total amount of polyol.

Where the amine-based polyether polyol is based upon an aminoalcohol, polyester polyols having functionalities of from about 2 to about 3 (preferably from about 2 to about 2.5) and molecular weights of from about 180 to about 900, preferably from about 300 to about 600 are preferably included in the reaction mixture in amounts of from about 5 to about 50%, most preferably from about 15 to about 35% of the total amount of polyol.

The HFC blowing agent employed in the process of the present invention may be any of the known hydrogen-containing fluorocarbons. Specific examples of such blowing agents include: 1,1,1,4,4,4-hexafluorobutane (HFC-356); the tetrafluoroethanes such as 1,1,1,2-tetrafluoroethane (HFC-134a); the pentafluoropropanes such as 1,1,2,2,3-pentafluoropropane (HFC-245ca), 1,1,2,3,3-pentafluoropropane (HFC-245ea), 1,1,1,2,3-pentafluoropropane (HFC-245eb), and 1,1,1,3,3-pentafluoropropane (HFC-245fa); the hexafluoropropanes such as 1,1,2,2,3,3-hexafluoropropane (HFC-236ca), 1,1,1,2,2,3-hexafluoropropane (HFC-236cb), 1,1,1,2,3,3-hexafluoropropane (HFC-236ea), 1,1,1,3,3,3-hexafluoropropane (HFC-236fa); the pentafluorobutanes such as 1,1,1,3,3-pentafluorobutane (HFC-365); and difluoroethanes such as 1,1-difluoroethane (HFC-152a). HFC-356 is particularly preferred. The blowing agent is generally included in the foam-forming mixture in an amount of from about 5 to about 20% by weight, based on the total foam formulation, preferably from about 8 to about 15% by weight.

Minor amounts of water are also included in the reaction mixtures of the present invention. As used herein, a minor amount of water is meant an amount of up to about 1.0%, preferably from about 0.5% to about 0.8%, most preferably from about 0.6 to about 0.7%, based on the total foam formulation.

Any of the catalysts known to be useful in the production of rigid polyurethane foams may be employed in the process of the present invention. Tertiary amine catalysts are particularly preferred. Specific examples of suitable catalysts include: pentamethyldiethylenetriamine, N,N-dimethylcyclohexylamine, N,N',N''-dimethylamino-propylhexahydrotriazine, tetramethylethylenediamine, tetramethylbutylene diamine and dimethylethanolamine. Pentamethyldiethylenetriamine. N,N',N''-dimethylamino-propylhexahydrotriazine, and N,N-dimethylcyclohexylamine are particularly preferred.

Materials which may optionally be included in the foam-forming mixtures of the present invention include: chain extenders, crosslinking agents, surfactants, pigments, colorants, fillers, antioxidants, flame retardants, and stabilizers. Carbon black is a preferred additive.

The isocyanate and isocyanate-reactive materials are used in quantities such that the equivalent ratio of isocyanate groups to isocyanate-reactive groups is from about 1.0 to about 1.8, preferably from about 1.0 to about 1.5.

Having thus described our invention, the following examples are given as being illustrative thereof. All parts and percentages given in these examples are parts by weight and percentages by weight, unless otherwise indicated.

EXAMPLES

The materials used in the following examples were as follows:

POLYOL A: a tetrafunctional polyol prepared by reacting ethylene diamine with propylene oxide. This polyol has an OH number of 770 and is available from Miles Inc. under the name Multranol E-9181.

POLYOL B: a trifunctional polyol prepared by reacting triethanolamine with propylene oxide. This polyol has an OH number of 150 and is available from Miles Inc. under the name Multranol E-9144.

POLYOL C: a tetrafunctional polyol prepared by reacting ethylene diamine with propylene oxide. This polyol has a OH number of 630 and is available from Miles Inc. under the name Multranol 4050.

POLYOL D: a trifunctional polyol prepared by propoxylating glycerine. This polyether polyol has an OH number of 250 and is available from Miles Inc. under the name Multranol E-9157.

POLYOL E: an aromatic polyester polyol having an OH number of 315 which is commercially available from Stepan Company under the name Stepanpol PS 3152.

POLYISOCYANATE A (NCO A): a modified polymethylene polyphenyl polyisocyanate prepolymer which is commercially available under the name Mondur E-577 from Miles Inc having an isocyanate group content of approximately 29.5%.

POLYISOCYANATE B (NCO B): Mondur MR isocyanate, a polymethylene polyphenyl polyisocyanate which is commercially available from Miles, Inc having an isocyanate content of about 31%.

CATALYST A (CAT. A): a tertiary amine catalyst which is commercially available from Air Products and Chemicals, Inc. under the name Polycat 8.

B-8426: a silicone surfactant which is commercially available from Goldschmidt Chemical Corporation under the designation B-8426.

HFC-356: 1,1,1,4,4,4-hexafluorobutane.

EXAMPLES 1–6

Foams were prepared by reacting the components listed in Table 1 in the amounts indicated by mixing the polyols, catalysts, surfactant, water and blowing agents to form a master batch. The master batch was then mixed with the amount of polyisocyanate indicated in Table 1 and poured into a 10.5 inch×10.5 inch×2.5 inch vertical mold. The free rise density was determined and the thermal conductivity of the foam was measured on an Anacon Model 88 K-factor machine. The properties of those foams are also reported in Table 1.

TABLE 1

| Example | 1 | 2 | 3 | 4 | 5 | 6 |
|---|---|---|---|---|---|---|
| Polyol A, pbw | 34.54 | 29.34 | 29.34 | 33.70 | 28.16 | 34.61 |
| Polyol B, pbw | 39.26 | 33.36 | 33.36 | 38.30 | 32.01 | 39.33 |
| B-8426, pbw | 1.55 | 1.30 | 1.30 | 1.55 | 1.25 | 1.55 |
| CAT. A, pbw | 1.75 | 3.00 | 5.50 | 1.95 | 6.14 | 1.55 |
| Water, pbw | 1.40 | 0 | 0 | 1.50 | 0 | 1.40 |
| HFC-356, pbw | 21.50 | 33.00 | 33.00 | 23.00 | 32.44 | 21.55 |
| OH # | 440 | 440 | 440 | 440 | 440 | 440 |
| NCO A | 116.0 | 77.70 | 77.70 | 115.6 | 77.70 | 116.0 |
| Index | 1.11 | 1.11 | 1.11 | 1.11 | 1.11 | 1.11 |
| 5 min. friability | slight | slight | slight | slight | slight | slight |
| Shrinkage | None | None | None | None | None | None |
| Core Density (lb/ft$^3$) | 2.26 | 2.33 | 2.33 | 2.10 | 2.24 | 2.36 |
| K-factor, initial BTU-in./hr. ft.$^2$ °F. | 0.130 | 0.131 | 0.128 | 0.130 | 0.135 | 0.129 |

EXAMPLES 7–11

Foams were produced in accordance with the procedure used in Examples 1–6. The materials and the quantities in which they were used are identified in Table 2. The properties of these foams are also reported in Table 2.

TABLE 2

| Example | 7 | 8 | 9 | 10 | 11 |
|---|---|---|---|---|---|
| Polyol A | 30.47 | 32.76 | 33.01 | 36.17 | 36.32 |
| Polyol B | 34.63 | 37.24 | 37.19 | 41.11 | 41.26 |
| B-8426 | 1.40 | 1.48 | 1.48 | 1.62 | 1.62 |
| Cat. A | 4.10 | 2.70 | 2.25 | 1.30 | 0.85 |
| Water | 0.50 | 1.00 | 1.00 | 1.80 | 1.80 |
| HFC-356 | 28.90 | 24.82 | 25.07 | 18.00 | 18.15 |
| NCO A | 89.50 | 104.30 | 104.30 | 127.40 | 127.40 |
| Index | 1.11 | 1.11 | 1.11 | 1.11 | 1.11 |
| K-factor, initial BTU-in./hr. ft.$^2$ °F. | 0.126 | 0.129 | 0.128 | 0.133 | 0.135 |
| 5 Min. friability | slight | slight | slight | slight | slight |
| Shrink. | none | none | none | none | none |
| Core Density, lb/ft$^3$ | 2.19 | 2.23 | 2.25 | 2.35 | 2.29 |

EXAMPLES 12–14

Foams were produced from the materials listed in Table 3 in the amounts indicated in Table 3 by the same procedure that was used in Examples 1–6. The properties of these foams are also reported in Table 3.

TABLE 3

| Example | 12 | 13 | 14 |
|---|---|---|---|
| POLYOL C, pbw | 33.48 | 33.48 | 32.93 |
| POLYOL D, pbw | 21.83 | 21.83 | 21.47 |
| POLYOL E, pbw | 17.47 | 17.47 | 17.18 |
| Water, pbw | 1.52 | 1.52 | 1.58 |
| B-8426, pbw | 1.52 | 0 | 1.58 |
| DC-5454, pbw | 0 | 1.52 | 0 |
| CAT A, pbw | 2.20 | 2.20 | 2.30 |
| R-356, pbw | 21.98 | 21.98 | 22.96 |
| NCO B, pbw | 107.7 | 107.7 | 0 |
| NCO A, pbw | 0 | 0 | 116.5 |
| Index | 1.11 | 1.11 | 1.11 |
| 5 Min. friability | corners slight | corners slight | corner |
| K-factor, initial BTU-in./hr. ft.$^2$ °F. | 0.128 | 0.132 | 0.126 |
| Core Density, lb/ft$^3$ | 1.82 | 1.83 | 1.86 |
| K-Factor (1 month aged) BTU-in./hr. ft.$^2$ °F. | 0.136 | 0.140 | 0.133 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of rigid polyurethane foams having a K-factor which is about 0.135 BTU-in./hr.ft.$^2$°F. or less comprising reacting
   a) an amine-initiated polyol having a molecular weight of at least 149 and a functionality of at least three with
   b) an organic polyisocyanate in the presence of
   c) water in an amount greater than 0 but less than or equal to 1.0% by weight, based on total weight of the foam-forming reaction mixture and
   d) a hydrogen-containing fluorocarbon.

2. The process of claim 1 in which the reaction mixture further includes one or more polyols having molecular weights of from about 92 to about 1500 which are not the same as amine-initiated polyol a).

3. The process of claim 1 in which the amine-initiated polyol has a molecular weight of from about 149 to about 1500.

4. The process of claim 1 in which the amine-initiated polyol a) is initiated with ethylene diamine, diethylenetriamine, hexamethylene diamine, an aromatic diamine, monoethanolamine, diethanolamine, triethanolamine or ammonia.

5. The process of claim 1 in which the HFC blowing agent is selected from the group consisting of hexafluorobutanes, hexafluoropropanes, pentafluoropropanes, pentafluorobutanes, difluoroethanes, tetrafluoroethanes and mixtures thereof.

6. The process of claim 1 in which the HFC d) is included in an amount of from about 5 to about 20%, based on the total weight of the foam-forming composition.

7. The process of claim 1 in which the equivalent ratio of isocyanate groups of b) to active-hydrogen groups of a) is from about 1.0 to about 1.8.

8. The process of claim 1 in which isocyanate b) is selected from the group consisting of polymeric MDI and isocyanate-terminated prepolymers prepared therefrom.

9. The process of claim 1 in which the amine-initiated polyol a) has a molecular weight of from about 300 to about 800 and isocyanate b) is polymeric MDI.

* * * * *